(12) United States Patent
Mukhami et al.

(10) Patent No.: US 7,778,892 B2
(45) Date of Patent: Aug. 17, 2010

(54) BONUS DEPRECIATION RECORD AND PROPOSAL SYSTEM

(75) Inventors: Harish Mukhami, Fargo, ND (US); Kimberly A. Nelson, Fargo, ND (US); Teresa A. Backes, West Fargo, MN (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 11/449,071

(22) Filed: Jun. 8, 2006

(65) Prior Publication Data

US 2008/0010176 A1 Jan. 10, 2008

(51) Int. Cl.
*G07B 17/00* (2006.01)
*G06Q 40/00* (2006.01)

(52) U.S. Cl. .............................. 705/30; 705/35; 705/36

(58) Field of Classification Search ........................ None
See application file for complete search history.

(56) References Cited

U.S. PATENT DOCUMENTS

| | | | | |
|---|---|---|---|---|
| 5,950,171 | A * | 9/1999 | Madell | 705/7 |
| 6,219,654 | B1 * | 4/2001 | Ruffin | 705/400 |
| 6,330,547 | B1 * | 12/2001 | Martin | 705/38 |
| 2002/0143673 | A1 * | 10/2002 | Hitchings et al. | 705/30 |
| 2002/0188558 | A1 * | 12/2002 | Morimoto | 705/39 |
| 2003/0023412 | A1 * | 1/2003 | Rappaport et al. | 703/1 |
| 2004/0117287 | A1 * | 6/2004 | Wang | 705/36 |
| 2004/0172318 | A1 * | 9/2004 | Shen | 705/7 |
| 2005/0216385 | A1 * | 9/2005 | Schneider | 705/35 |
| 2006/0015433 | A1 * | 1/2006 | Arnott et al. | 705/35 |
| 2006/0155564 | A1 * | 7/2006 | Fisher et al. | 705/1 |

FOREIGN PATENT DOCUMENTS

WO WO 00/67169 * 11/2000

OTHER PUBLICATIONS

"Sage Accounting Guide," published Feb. 2005. AAT (Association of Accounting Technicians), pp. 1-26 with 10 page attachment.*
Little Rock Arkansas, Request for Proposal, RFP#5329—Enterprise Resource Planning System, RFP Issued Sep. 26, 2005, pp. 1-106, 4 page introduction.*
"Differential Reporting Incentives and Their Impact on Financing Decisions: A Look at Public Defense Contractors," Suzanne G. Morsfield and Christine E.L. Tan, Jun. 2005, pp. 1-26.*

* cited by examiner

*Primary Examiner*—F. Ryan Zeender
*Assistant Examiner*—Faris Almatrahi
(74) *Attorney, Agent, or Firm*—Joseph R. Kelly; Westman, Champlin & Kelly, P.A.

(57) ABSTRACT

A system has been invented that enables recording and proposing bonus depreciations, with a variety of advantageous features. The system enables a computing device to receive user-defined bonus depreciations, receive records of assets, and propose values for the bonus depreciations as applied to the assets. Bonus depreciations may be recorded and associated with several different classifications of assets, enabling the right bonus depreciations to be proposed for the right assets as they are recorded. This may include applying several bonus depreciations to the same assets while maximizing bonus depreciations within statutory requirements.

16 Claims, 5 Drawing Sheets

BONUS DEPRECIATION RECORD AND PROPOSAL SYSTEM

BACKGROUND

Bonus depreciation is the ability to take extra or bonus depreciation amounts for the first year an asset is placed in service and depreciated. Bonus depreciation is generally taken for tax purposes. Because tax legislation often changes, bonus depreciation functionality may become outdated relatively quickly.

The discussion above is merely provided for general background information and is not intended to be used as an aid in determining the scope of the claimed subject matter.

SUMMARY

A system has been invented that enables recording and proposing bonus depreciations, with a variety of advantageous features. The system enables a computing device to receive user-defined bonus depreciations, receive records of assets, and propose values for the bonus depreciations as applied to the assets. Bonus depreciations may be recorded and associated with several different classifications of assets, enabling the right bonus depreciations to be proposed for the right assets as they are recorded. This may include applying several bonus depreciations to the same assets while maximizing bonus depreciations within statutory requirements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Solutions for bonus depreciation records and proposals have been invented. Any number of bonus depreciation transactions can be manually entered against an asset/depreciation book without having any specific bonus depreciation records defined. Manually entered bonus transactions are taken into consideration when calculating additional bonuses through a bonus depreciation proposal process or when doing a depreciation proposal.

A variety of illustrative features and implementations are described herein that help illustrate the inventive subject matter, although that subject matter is broader than can be described herein in complete detail, and is not limited to the particular illustrative examples provided herein.

Figure 1:
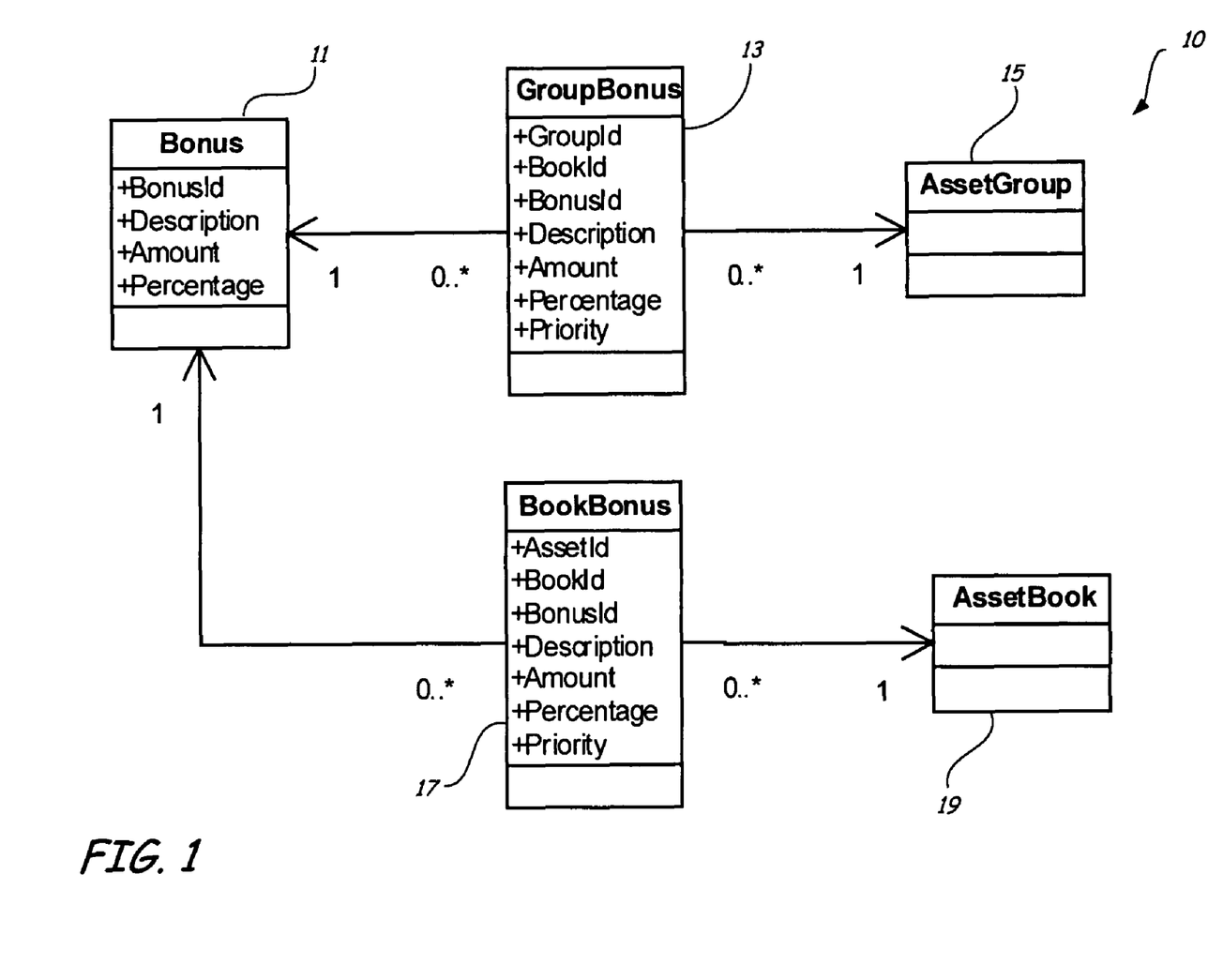
FIG. 1 depicts an object model diagram of a bonus depreciation record and proposal system, according to an illustrative embodiment.

FIG. 1 depicts an object model diagram of a system 10 for a system for recording and proposing bonus depreciations, according to object model diagramming conventions familiar to those skilled in the art. System 10 includes Bonus objects 11, GroupBonus objects 13, and BookBonus objects 17 that enable user-defined bonus depreciations. GroupBonus objects 13 and BookBonus objects 17 may both be used to define any number of Bonus objects 11. Additionally, a GroupBonus object 13 may be used to define any number of AssetGroup objects 15, and a BookBonus object 17 may be used to define any number of AssetBook objects 19.

Figure 2:
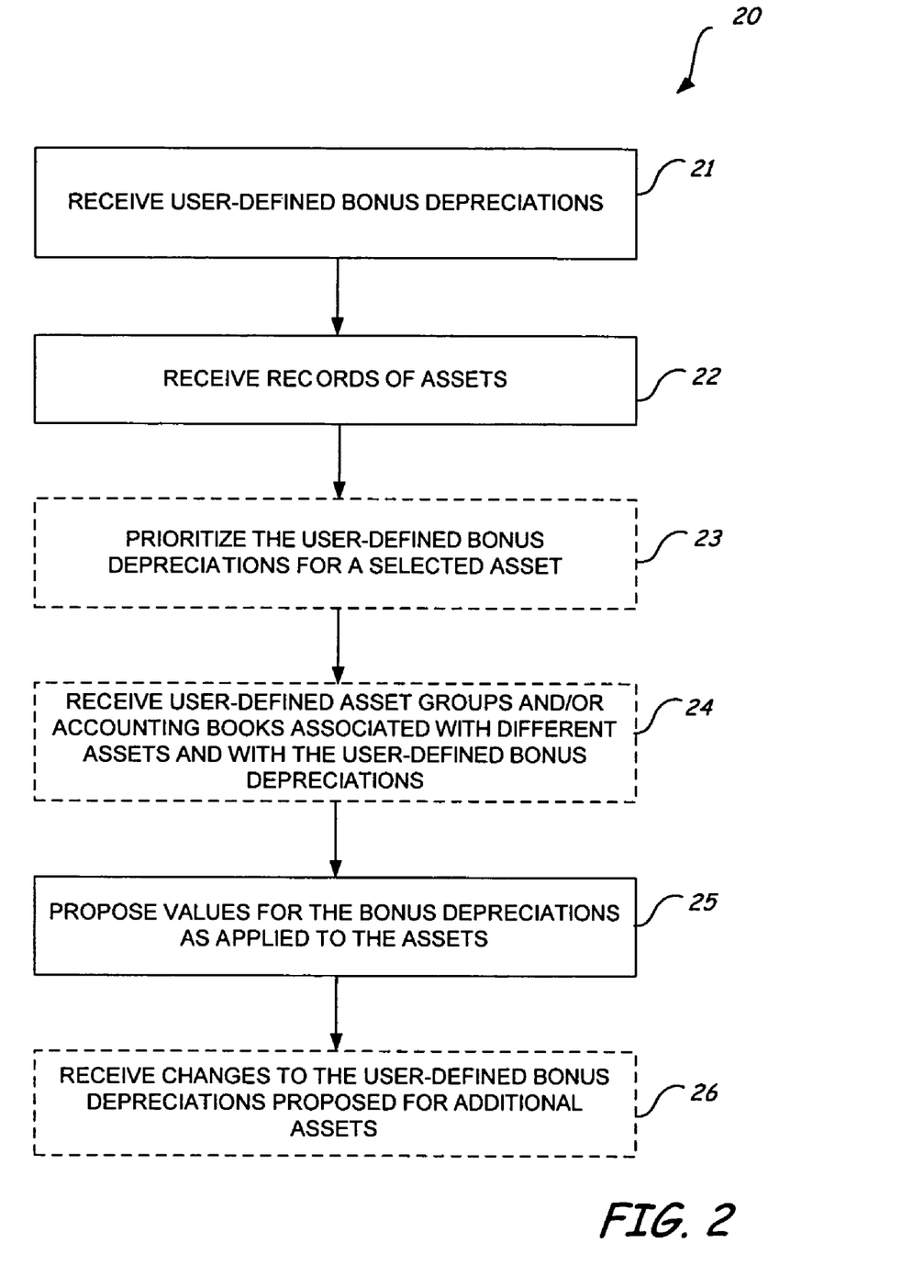
FIG. 2 depicts a flowchart for a method associated with providing bonus depreciation records and proposals, according to an illustrative embodiment.

FIG. 2 depicts a flowchart for a method 20 associated with system 10. According to one illustrative implementation, a software application corresponding to system 10 enables a computing device to receive one or more user-defined bonus depreciations, which may correspond to Bonus objects 11, as in step 21; receive records of one or more assets, which may, for example, be associated with AssetGroup objects 15 or AssetBook objects 19, as in step 22; and propose values for the bonus depreciations as applied to the assets, as in step 25. Proposing the depreciation values for the assets may be part of a larger process of calculating depreciation values for the assets, which may be used to analyze or formulate a tax strategy or to prepare a tax filing, for example. Method 20 includes several additional steps, indicated in dashed marks to indicate that they may occur in some embodiments and not in others; these steps are described further below. The step of proposing values for the bonus depreciations is further elaborated below with reference to FIG. 3.

A user may enter or modify depreciation bonuses as independent transactions, with or without reference to particular assets at the time the depreciation bonuses are set up or modified. The bonus depreciations defined by the user may be stored and may be made available over a network or other distributed utility, for application across a large organization or organizations, including for assets that are entered much later in time and in different locations. This enables flexibility for a user to prepare depreciation solution systems at a time or place independently of entering records for assets or of using proposed bonus depreciations for the assets. It also enables the flexibility to respond quickly and with a generalized solution to changes in tax laws that define the bonus depreciations, which may be frequent, irregular, and unpredictable.

For example, bonus depreciation transactions may be recorded by a tax attorney, and assets may be recorded by a logistics manager in a different department of the organization, months or years after the tax attorney recorded the bonus depreciations, and in a very distant physical location. However, system 10 will compare the newly recorded assets against the recorded user-defined bonus depreciations, select bonus depreciations applicable to the assets, and make proposals for the bonus depreciations to be used in association with those assets, according to the present illustrative embodiment. Those proposals might be made to a third user separated in time and space from the first two users—for example, an accountant in another department, preparing a tax analysis or tax filing for the organization. As another alternative, the bonus depreciation records may be entered manually by an outsourced or specialized tax management service, which share their results by agreement with separate organizations.

The system is also generalized to enable bonus depreciations to be defined with reference to any currency and any jurisdiction's tax laws. Bonus depreciations may also be defined according to a variety of forms; for example, some bonus depreciations may be in the form of a flat amount, while other bonus depreciations may be in the form of a percentage of a value associated with applicable assets. Different bonus depreciations may be applicable to the same assets, and the system enables the flexibility to apply those multiple bonus depreciations, using a prioritization of the bonus depreciations, which is described further below.

One or more bonus depreciations may be applied to an asset, and subtracted from its basis, prior to subtracting an additional regular depreciation, for example. System 10 may include interfaces or forms for a user to enter defining values or parameters, such as basis values, bonus depreciations, and regular depreciations, that are received by a computing device, for example. Bonus depreciations and other data determined by system 10 may be provided on a user output device such as a monitor, or may be incorporated into forms for tax filings, for example. System 10 may function as part of a larger system for generalized tax solutions.

Bonus depreciations are generally taken during the first reporting period that an asset is acquired or placed into service, prior to taking normal depreciation. According to the present illustrative embodiment, system 10 will take that into account by using a default that applies bonus depreciations prior to normal depreciation, and does not apply bonus depreciations to an asset for which depreciation has previously been taken. Another option may be used for applying bonus depreciations to an asset for which normal depreciation has previously been taken. This is sometimes called extraordinary depreciation, but may be applied as another application of user-defined bonus depreciations where the applicable jurisdiction provides for their use.

As depicted in FIG. 1, Bonus objects 11 have certain attributes, such as a BonusID, a Description, an Amount, and a Percentage attribute, in this illustrative embodiment. A user may create a new Bonus object 11 based on a Bonus class, and define a unique BonusID attribute for it. The user may optionally define a Description attribute for the object, as well as either an Amount attribute giving a flat amount for the particular bonus attribute, or a Percentage attribute giving a percentage amount. A user may define any number of Bonus objects 11 and provide each with its own unique attributes. Such Bonus objects may then be used immediately to evaluate bonus depreciations for assets, or they may be stored and/or transmitted for use in another time and place.

A user may also define a GroupBonus object 13, defining an asset group, or a BookBonus object 17, defining an accounting book, in this illustrative embodiment. The GroupBonus object 13 is associated with the AssetGroup object 15 and may be used for defaulting bonus depreciation values from Bonus objects 11, AssetGroup objects 15, and/or BookBonus objects 17 associated with the GroupBonus object 13, for example.

GroupBonus objects 13 and BookBonus objects 17 may be used to define asset groups and accounting books, respectively, and bonus depreciations applicable to generalized sets of assets associated with those asset groups and/or accounting books, as in step 24 of method 20 in FIG. 2. Besides the attribute types shared in common with Bonus object 11, GroupBonus object 13 and BookBonus object 17 both include additional attributes for managing groups of assets. For example, both GroupBonus object 13 and BookBonus object 17 include a BookID attribute, which the user may fill in to associate either type of object with a certain accounting book. GroupBonus object 13 also includes a GroupID attribute that may be used for a common identifier for an asset group, and BookBonus object 17 includes an AssetID attribute that may be used to associate the accounting book with particular assets, in this illustrative embodiment.

AssetGroup object 15 may be used to define a certain type of asset, which has defining characteristics to meet eligibility requirements of a certain bonus depreciation or are otherwise of interest in applying bonus depreciations. For example, one AssetGroup object 15 may be applied to all of the buildings owned by an organization; another AssetGroup object 15 may be applied to all the office furniture owned by the organization; yet another AssetGroup object 15 may be applied to all the motor vehicles owned by the organization, and so forth, in this illustrative embodiment.

Then, one of the AssetGroup objects 15 may be assigned one or more bonus depreciations defined by a user. With the assignment of that one user-defined bonus depreciation to the AssetGroup object 15, and thereby to a particular asset group, corresponding user-defined bonus depreciations can be proposed for or applied to all the assets associated with that asset group. When new assets are entered by the same user or other users associated with the organization, the new assets can be checked for whether they belong to an asset group corresponding to a particular AssetGroup object 15, and if so, the corresponding bonus depreciation or depreciations may automatically be proposed for or applied to those assets as a default, in this illustrative embodiment. Options may also be provided that the user may select to modify or discard the proposed or applied default bonus depreciations for particular assets, without affecting the default bonus depreciations applied to the other assets in that asset group, as in step 26 of method 20 in FIG. 2.

Bonus depreciation records can also be associated with a BookBonus object 17, which can be used to apply default bonus depreciations to AssetBook objects 19, associated with assets listed in a particular accounting book. For example, one organization might keep different accounting books with reference to different tax jurisdictions to which it is subject, and among which its assets are distributed. This might involve different accounting books for assets in different countries, or for the accounting for the same assets with reference to state and federal taxes, or for the same assets with reference to an alternative minimum tax (AMT) accounting, for example. As with the asset groups, a user may use a BookBonus object 17 to assign a blanket default bonus depreciation to the particular corresponding accounting book group, and may thereafter modify or discard bonus depreciations proposed for or applied to a particular asset, without disturbing the default bonus depreciations applied to the other assets in the accounting book group.

There are therefore several different ways in which a user may define bonus depreciations for different assets. It may often be the case that two or more different bonus depreciations may apply to the same asset. If the bonus depreciations are of mixed type, for example between flat amounts and percentages, then the order of priority in which the bonus depreciations are applied becomes a non-trivial concern.

As depicted in FIG. 1, both GroupBonus object 13 and BookBonus object 17 include an attribute called "priority", for indicating the priority of order with which the associated bonus depreciations will be applied when processing a bonus depreciation proposal, in the event of combination with additional bonus depreciations for the same assets. System 10 may check whether more than one of the user-defined bonus depreciations is applicable to a selected asset, and if so, then determine an order of prioritization for the bonus depreciations for the selected asset, as in step 23 of method 20 in FIG. 2. System 10 will automatically prevent identical priorities from being assigned to different asset groups or different accounting books, so that a conflict in the prioritization does not occur, in the present illustrative embodiment.

In some cases, the priority of order in which bonus depreciations should be applied may be specified by the applicable tax law. In this case, the Priority attributes may be defined to reflect that specification, and ensure that it is carried out in practice, across all assets to which it is applicable as their records are received. In other cases, the priority of order in which bonus depreciations are to be applied may not be specified. In this case, system 10 may calculate which possible prioritization of the user-defined bonus depreciations maximizes the value for the bonus depreciations for the selected asset, and propose or apply the prioritization that yields the maximum bonus depreciations.

For example, an asset group may have two bonus depreciations applicable to it, where one bonus depreciation consists of a flat amount and the other bonus depreciation consists of a percentage. System 10 may then apply the bonus depreciation consisting of the percentage first, and thereafter apply the bonus depreciation consisting of the flat amount, thereby maximizing the total bonus depreciation applied to those assets, because the percentage depreciation is then applied against the full original basis, rather than against the amount reduced by prior application of the flat amount depreciation.

Figure 3:
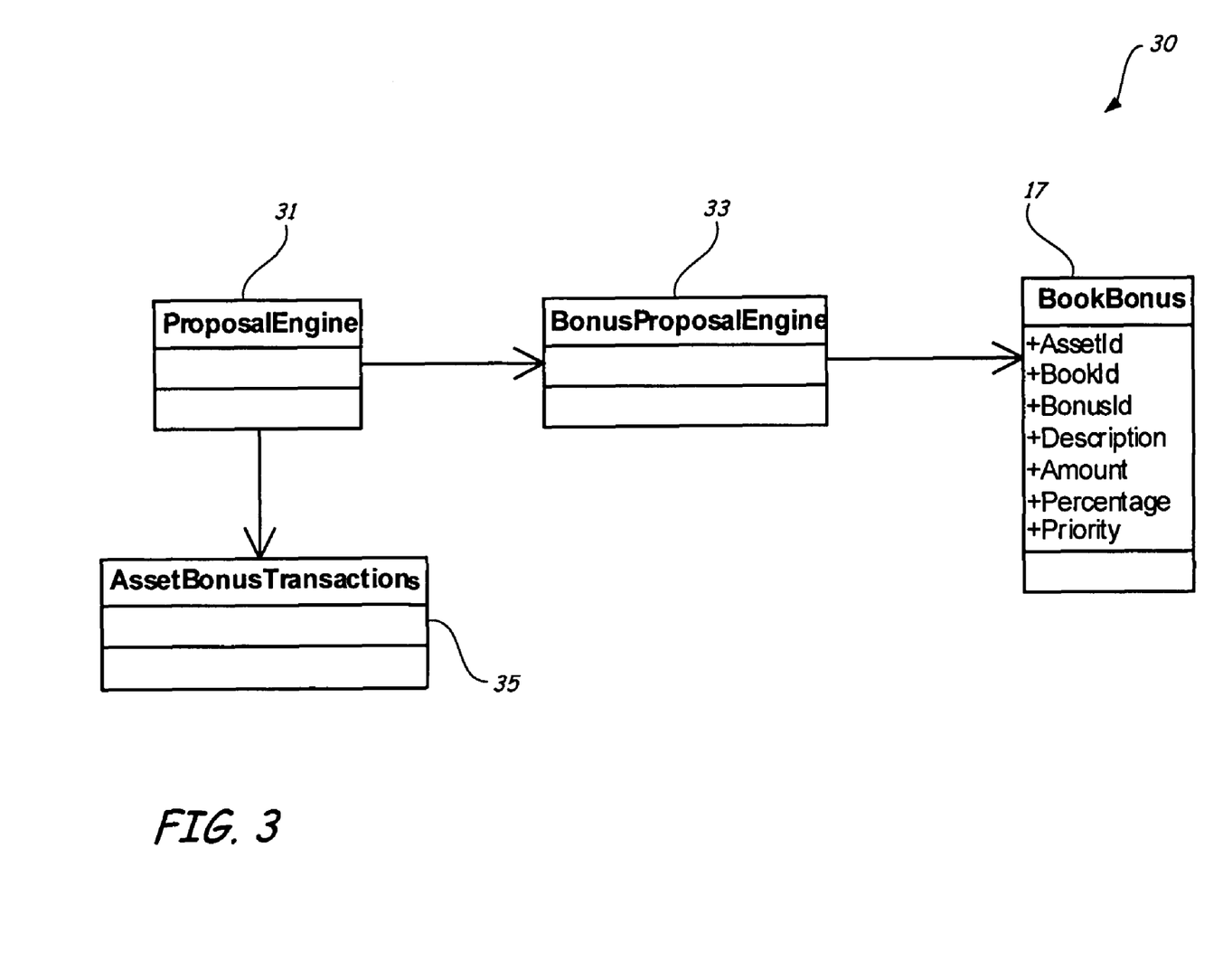
FIG. 3 depicts an object model diagram of a bonus depreciation record and proposal system, according to an illustrative embodiment.

FIG. 3 depicts another object model diagram of a system 30, which illustrates another one of the inventive aspects that also includes system 10, with which it is associated. System 30 is involved with the process of proposing bonus depreciations to be applied to different assets, according to the present illustrative embodiment.

ProposalEngine object 31 may receive a notice to generate AssetBonusTransaction objects 35, corresponding to asset bonus depreciation transactions, to be applied to assets associated with an AssetBook object, for example. The ProposalEngine object 31 may then call the BonusProposalEngine 33, which is associated with a BookBonus object 17, in this illustrative embodiment, and may use the BookBonus object 17 and its own internal rules to calculate the value of each bonus depreciation that may be proposed for the assets under consideration. The BonusProposalEngine object 33 then returns the bonus amount to the ProposalEngine object 31, which then creates an AssetBonusTransaction object 35 that specifically defines the value of the bonus depreciation to be proposed for a corresponding asset.

The system may compare the records of the assets with the asset groups (which may include assets grouped by accounting book, in this example) to select matching bonus depreciations associated with matching asset groups. The system may then propose usage of the matching bonus depreciations with the assets.

The system may subsequently receive records of additional assets with an asset type matching an asset type for one of the before-mentioned assets. The system may then propose that the user-defined bonus depreciations indicated for the before-mentioned assets be applied to the additional asset. A user may accept the new bonus proposal, by default in some implementations, or with modifications. The system may then respond to this acceptance of the proposed bonus depreciations by calculating values for the bonus depreciations for the additional asset.

An example of the use of a bonus depreciation proposal system is provided as follows, according to another illustrative embodiment. In an illustrative tax situation, a user is subject to United States federal tax law, which specifies two different bonus depreciations for federal tax purposes in a given fiscal year.

In this particular example, a user uses an illustrative embodiment to generate a total bonus depreciation amount for a particular commercial building that was first put into service during the fiscal year, with a basis of $550,000. One bonus depreciation is encoded in section 179 of the U.S. Internal Revenue Code for the given year, and specifies a bonus depreciation for qualified property, and provides a flat amount bonus depreciation of $50,000 as applied to this building.

The other applicable bonus depreciation is included in a temporary Recovery Opportunity Act applicable only to the given fiscal year, targeted toward certain asset losses due to a major natural disaster that occurred earlier that year, in the area where the building is located. The damage to the building is such that it qualifies for a 50% bonus depreciation, cumulatively with the section 179 bonus depreciation.

The user may define bonus depreciations corresponding to these applicable authorizations. The user may also create an asset group called Buildings, to which these bonus depreciations are indicated to be applicable. The user may then add this particular building to the Buildings asset group. Near the end of the fiscal year, the user runs the depreciation transaction proposals for a Federal Tax depreciation book, to prepare for related tax filings.

According to one example, the Recovery Opportunity Act specifies that its bonus depreciation can only be applied after any applicable section 179 bonus depreciation. In this case, the system calculates the applicable bonus depreciations for the asset in question, assigning them the prioritization specified by statute, of the section 179 flat amount bonus depreciation first, followed by the percentage bonus depreciation at 50%. After the flat $50,000 is deducted from the basis for the first bonus depreciation, the 50% is applied to the difference of $500,000, for a second bonus depreciation of $250,000, and a sum total bonus depreciation of $300,000. The system proposes this priority of bonus depreciations with this total, which the user may accept, discard, or modify. With the bonus depreciations now exhausted, the system records the building's basis for normal depreciations at $250,000.

In another example, the facts may be the same except that the applicable law does not specify the order of priority in which the two bonus depreciations are to be calculated. In this case, the system may evaluate the available bonus depreciations and propose a set of bonus depreciations with an order of prioritization that maximizes the total bonus depreciation. In this case, the system assigns an earlier priority to the percentage bonus depreciation, and a later priority to the flat amount bonus depreciation. The system therefore calculates the bonus depreciations as $275,000, as 50% of the basis of $550,000, plus the flat amount of $50,000, for a total of $325,000, or a ten percent premium over the total calculated with the reverse order of prioritization.

The system also provides safeguards to ensure that other considerations are taken into account in calculating the bonus depreciations. For example, the system may check whether the calculated value for the bonus depreciation for a selected asset is greater than the value or basis of the selected asset. If it is, then the system resets the value of the bonus depreciation of the selected asset equal to the value of the selected asset, so that the entire value of the asset may be depreciated, but the bonus depreciation cannot actually be greater than the basis of the asset being depreciated.

Various embodiments may run on or be associated with a wide variety of hardware and computing environment elements and systems. For example, a medium readable by a computing device may include executable instructions that configure a computing device to run applications, perform methods, and provide systems associated with different embodiments. Some illustrative features of exemplary embodiments such as are described above may be executed on computing devices such as computer 110 or mobile computing device 201, such as depicted in FIGS. 4 and 5.

Figure 4:
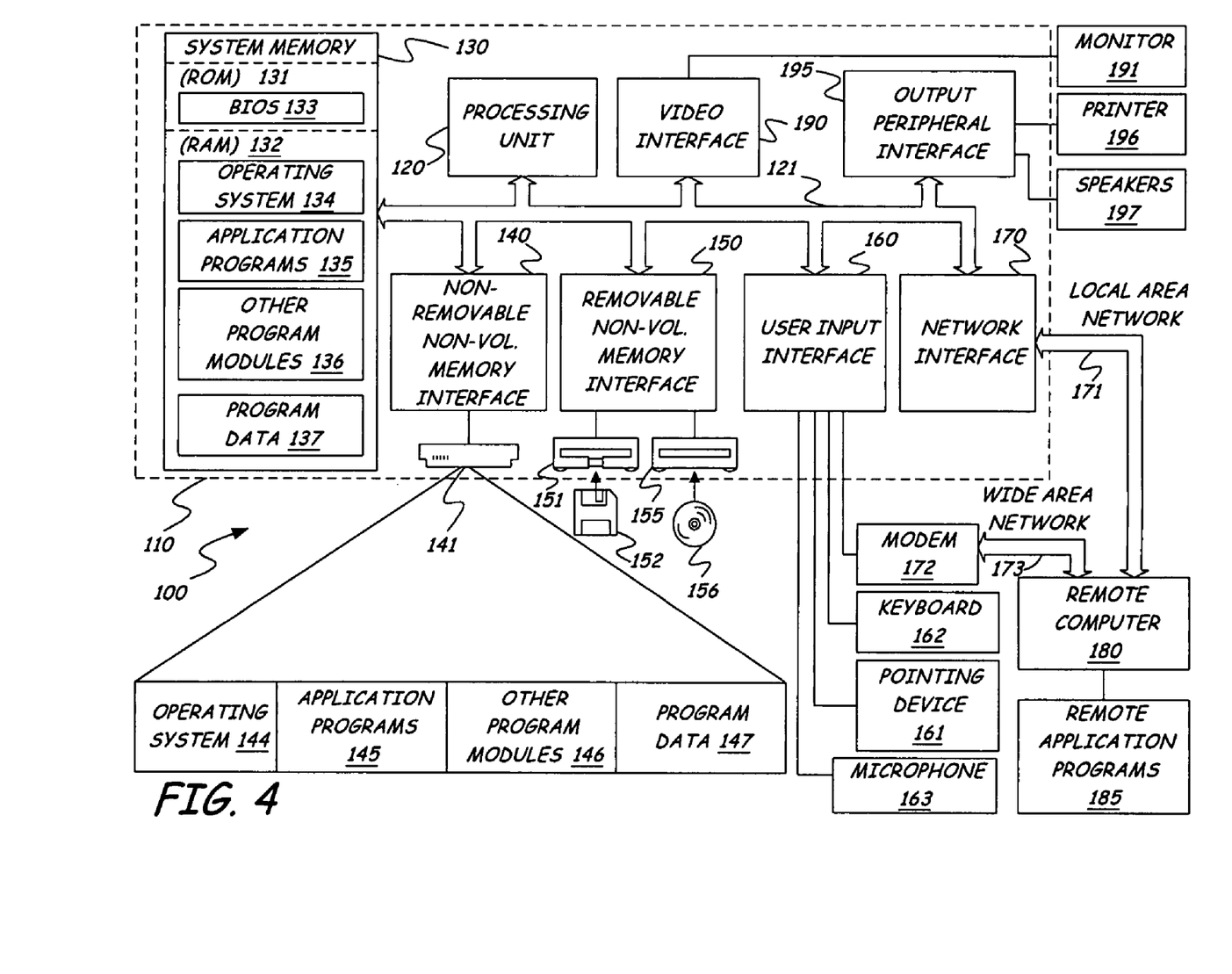
FIG. 4 depicts a block diagram of a general computing environment, comprising a computer and a medium readable by the computer, and comprising executable instructions that are executable by the computer, according to an illustrative embodiment.
Figure 5:
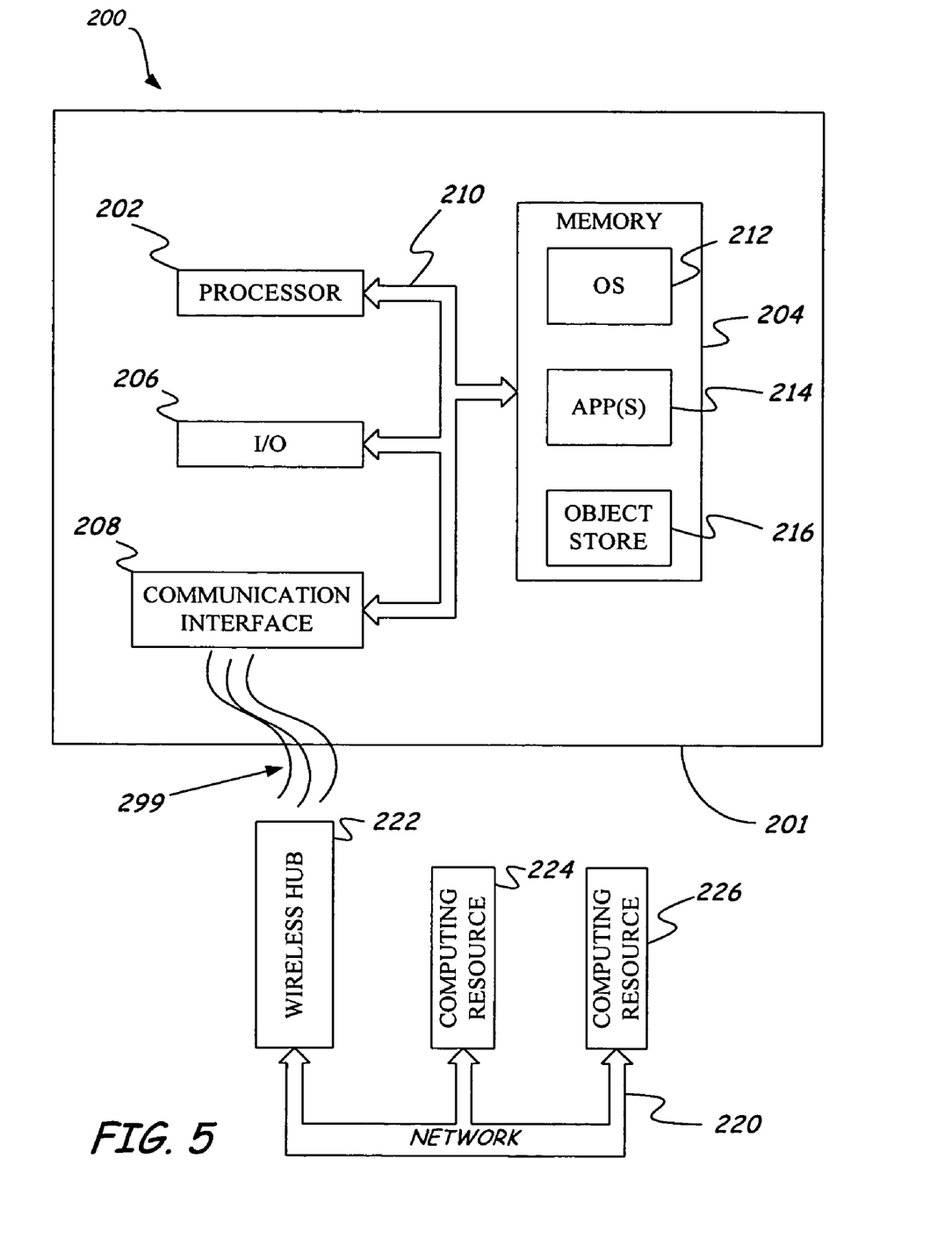
FIG. 5 depicts a block diagram of a general mobile computing environment, comprising a mobile computing device and a medium readable by the mobile computing device, and comprising executable instructions that are executable by the mobile computing device, according to an illustrative embodiment.

FIG. 4 depicts a block diagram of a general computing environment 100, comprising a computer 110 and various media such as system memory 130, nonvolatile magnetic disk 152, nonvolatile optical disk 156, and a medium of remote computer 180 hosting remote application programs 185, the various media being readable by the computer and comprising executable instructions that are executable by the computer, according to an illustrative embodiment. FIG. 4 illustrates an example of a suitable computing system environment 100 on which various embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Various embodiments may be implemented as instructions that are executable by a computing device, which can be embodied on any form of computer readable media discussed below. Various additional embodiments may be implemented as data structures or databases that may be accessed by various computing devices, and that may influence the function of such computing devices. Some embodiments are designed to be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on remote computer 180. It will be appreciated that the network connections shown are exemplary and other means of establishing a communications link between the computers may be used.

FIG. 5 depicts a block diagram of a general mobile computing environment, comprising a mobile computing device and a medium, readable by the mobile computing device and comprising executable instructions that are executable by the mobile computing device, according to another illustrative embodiment. FIG. 5 depicts a block diagram of a mobile computing system 200 including mobile device 201, according to an illustrative embodiment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may be the Internet, a wide area network, or a local area network, for example—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Naturally, any number of computing devices in any locations may be in communicative connection with network 220. Computing device 201 is enabled to make use of executable instructions stored on the media of memory component 204, such as executable instructions that configure a computing device to provide solutions for bonus depreciation records and proposals. For example, according to one illustrative embodiment, the executable instructions may enable mobile computing device 201 to receive bonus depreciation transactions, receive records of assets, calculate depreciation values, and propose depreciation values for the assets via a user output, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, executed with a computing device comprising one or more processors, and one or more input components and one or more output components communicatively connected to one or more of the processors, the method comprising:
    receiving, via one or more of the input components, one or more indications of user-defined bonus depreciations that are not included in previously defined regular depreciations;
    receiving, via one or more of the input components, records of one or more assets;
    calculating, using one or more of the processors, proposed values for the bonus depreciations as applied to the assets;
    checking whether more than one of the user-defined bonus depreciations is applicable to a selected asset from among the assets, and if so, then ordering the more than one of the user-defined bonus depreciations for the selected asset in an order of priority in which to apply the more than one bonus depreciations to the selected asset in order to both conform to applicable tax law and to maximize the value for the bonus depreciations for the selected asset; and
    providing the proposed values for the bonus depreciations as applied to the assets via one or more of the output components.

2. The method of claim 1, wherein at least one of the bonus depreciations consists of a flat amount.

3. The method of claim 1, wherein at least one of the bonus depreciations consists of a percentage.

4. The method of claim 1, wherein prioritizing the user-defined bonus depreciations for the selected asset comprises following a specified prioritization among the user-defined bonus depreciations.

5. The method of claim 1, wherein prioritizing the user-defined bonus depreciations for the selected asset comprises calculating which possible prioritization of the user-defined bonus depreciations maximizes the value for the bonus depreciations for the selected asset, and applying that prioritization.

6. The method of claim 1, wherein at least one of the bonus depreciations consists of a flat amount and at least one of the bonus depreciations consists of a percentage, wherein prioritizing the bonus depreciations for the selected asset comprises applying the bonus depreciation consisting of the percentage first, and thereafter applying the bonus depreciation consisting of the flat amount.

7. The method of claim 1, further comprising receiving one or more user-defined asset groups associated with different assets and with the user-defined bonus depreciations.

8. The method of claim 7, further comprising comparing the records of the assets with the asset groups to select matching bonus depreciations associated with matching asset groups, and proposing usage of the matching bonus depreciations with the assets.

9. The method of claim 8, further comprising receiving a record of an additional asset with an asset type matching an asset type for one of the before-mentioned assets, and proposing that the user-defined bonus depreciations indicated for the before-mentioned assets be applied to the additional asset.

10. The method of claim 9, further comprising responding to an acceptance of the proposed bonus depreciations being applied to the additional asset by calculating values for the bonus depreciations for the additional asset.

11. The method of claim 9, further comprising receiving one or more changes to the user-defined bonus depreciations proposed for the additional asset.

12. The method of claim 1, further comprising receiving one or more user-defined accounting books associated with one or more of the assets, and receiving user-defined bonus depreciations associated with the accounting books.

13. The method of claim 1, further comprising checking whether the calculated value for the bonus depreciation for a selected asset from among the assets is greater than a value of the selected asset, and if so, then resetting the value of the bonus depreciation of the selected asset equal to the value of the selected asset.

14. The method of claim 1, further comprising storing records of the bonus depreciations for the assets.

15. The method of claim 1, further comprising using the values calculated for the bonus depreciations for the assets in a tax filing.

16. A medium, comprising instructions readable by a computing device that, when executed by the computing device, configure the computing device to:
    receive one or more bonus depreciation transactions that are user-defined and are separate from regular depreciation for assets to which the bonus depreciation transactions are applicable;
    receive one or more records of assets;
    calculate bonus depreciation values for the assets, including any of the bonus depreciation transactions that are applicable to the assets by checking to determine whether more than one of the bonus depreciation transactions are applicable to each of the assets and, if so, ordering application of the more than one bonus depreciation transactions to a given asset in an order that complies with applicable tax laws and maximizes the bonus depreciation value for the given asset;
    calculate overall depreciation values for the asset by calculating a value for regular depreciation as applied to the assets after the bonus depreciations are calculated for the assets; and
    propose the overall depreciation values for the assets via an output mechanism of the computing device.

* * * * *